C. DENTON.
Harvesters.
No. 147,748.        Patented Feb. 24, 1874.
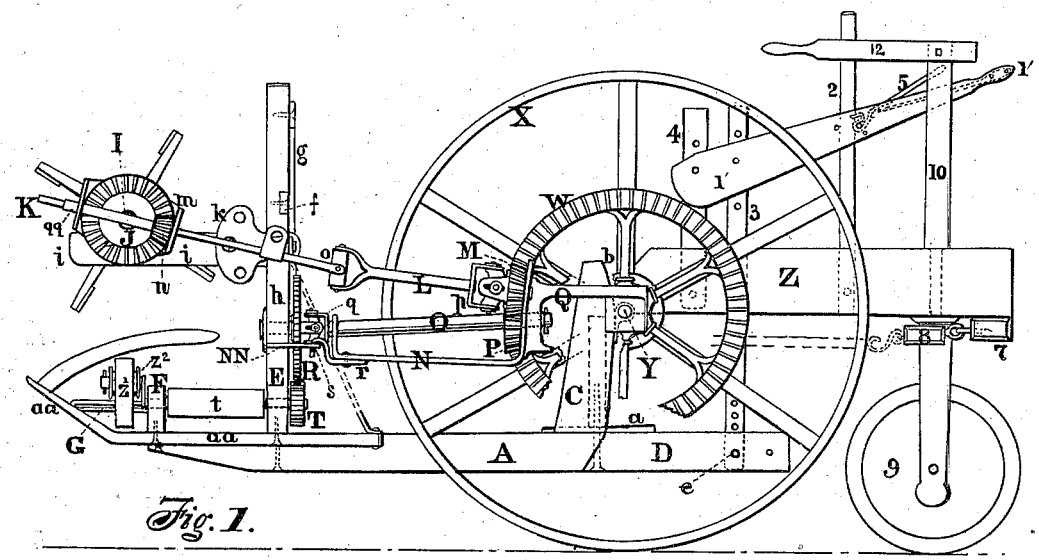
Fig. 1.
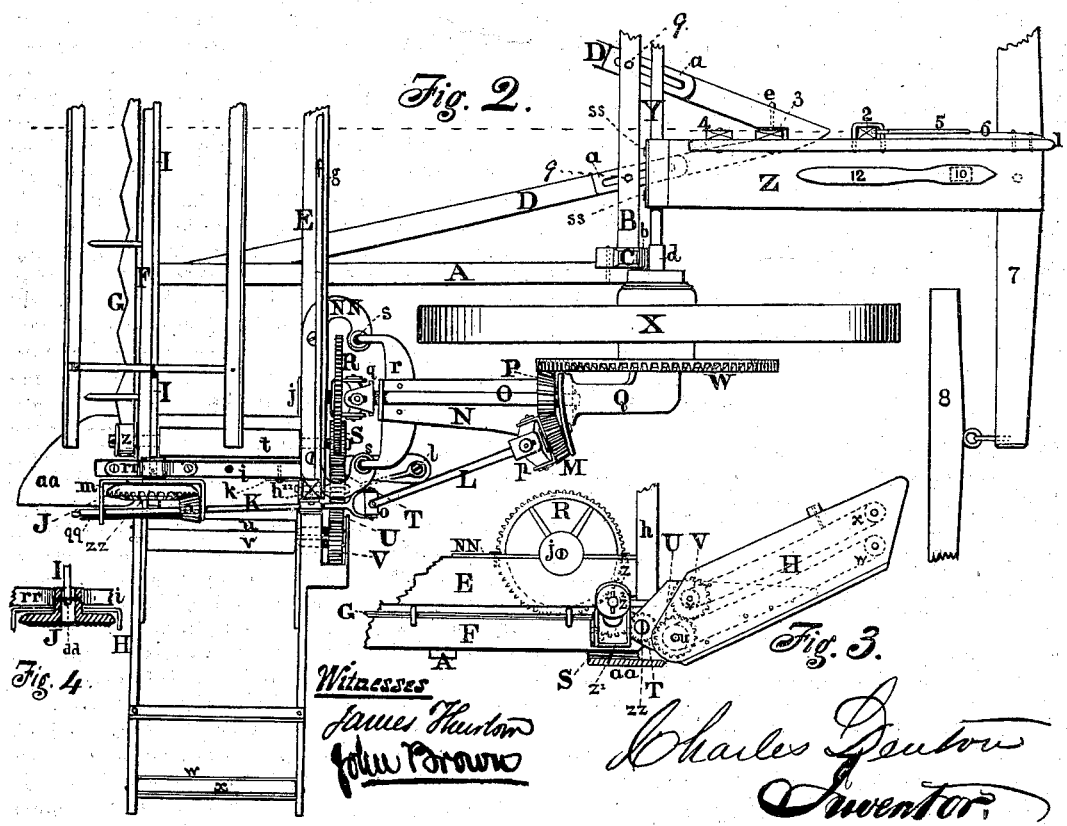
Fig. 2.
Fig. 3.
Fig. 4.
Witnesses
James Thurlow
John Brown
Charles Denton
Inventor

UNITED STATES PATENT OFFICE.

CHARLES DENTON, OF PEORIA, ILLINOIS.

IMPROVEMENT IN HARVESTERS.

Specification forming part of Letters Patent No. 147,748, dated February 24, 1874; application filed December 4, 1873.

*To all whom it may concern:*

Be it known that I, CHARLES DENTON, of the city of Peoria, in the county of Peoria and in the State of Illinois, have invented new and useful Improvements in Harvesters; and do hereby declare that the following is a full, clear, and exact description thereof, reference being had to the annexed drawings making a part of this specification, in which like letters of reference refer to like parts, and in which—

Figure 1 represents a side elevation, with the elevator H removed to show the platform E F. Fig. 2 is a plan view of that half of the machine which carries the gearing. The other half (not shown in plan) is similar, except the gearing. Fig. 3 is a front elevation of the right end of sickle-bar, platform, elevator, rollers, and gearing. Fig. 4 is a section of reel-pinion J.

Like letters in all the figures of the drawings indicate like parts.

This machine belongs to that class of harvesters known as headers; and my invention consists in working the reel by direct connection to a cog-wheel upon one of the supporting-wheels of the machine by means of shafts, pinions, and universal joints; also, in operating the sickle and drapers by a chain of pinions driven by a cog-wheel on the platform, connected, by universal joint, with a shaft and pinion, also engaged with said cog-wheel on said supporting-wheel. Said shaft and pinion are supported in a frame centered upon the axle of the said supporting-wheel, and is hinged to the reaping-platform, to preserve the engaged parts intact during operation, or in raising or lowering the frame upon the axle of the machine; also, in making the elevator removable complete, for attachment of a dropper for grain, as will be hereinafter more fully explained, and pointed out in the claims.

The frame of the machine is composed of parallel bars A A. (See Fig. 2, which shows one-half of machine fastened under the reaping-platform E F, and ending, in front of axle Y, in two vertical posts, C C, to which the axle is attached by movable bearings d d.) These posts are braced together by a cross-bar, B, and have each a posterior curved face, b, whose radial center is at the sockets s s of the plate N N on the platform E F, for the adjustable attachment of different heights of the frame A B C D D to the axle Y by the journals d, in order to cut grain at higher or lower points, and at same time to preserve the engagement of the gearing O P M L K between the said axle and the platform. The bars A A are further braced to bar B by converging bars D D, adjustably connected to said bar B by bolts g g, which pass through slotted wedges a a, one between each place of contact. E is the rear beam of the platform, F the front beam or sickle-bar, and have the usual draper-rollers t between them at each end, and the usual grain-dividers a a a a below; G, the sickle, which is worked by a crank provided with a friction-roller, $Z^2$, working in a slot-frame, $Z^1$, attached to the end of sickle. Said crank is a continuation of the axle of the draper-roller t, whose remoter end carries a pinion, S, engaged with spur-wheel R. H is the elevator, pivoted to and extending upward from the end of the platform E F. It is pivoted to each bar E F by pivotal bolts Z Z Z Z, so as to be removed complete without removing said bolts, for the immediate attachment of a grain-dropper, if desired. It has a parallel line of drapers, which carry up the grain between their opposite surfaces, and has, for this purpose, two lower rollers, u u, and two upper rollers, w x, the two former being engaged by the pinions U V, and the pinion U being engaged with the idle-pinion J, next to the crank-pinion S. I is the reel-shaft, having four or more slats, and is jointed, at d d, Fig. 4, to the collar of a pinion, J, which runs freely in the journal r r on the horizontal arm i. The collar of pinion J carries a swinging journal-plate, m, having journals at either end in arms which project in front of the face of said pinion, to carry the pinion-shaft K, with its sleeve q q. The reel-shaft I and pinion J have removable journals r r, adjustable upon the bar i, which itself is adjustable at different angles upon the perforated plate k on the standard h, which rises from the platform. The joint of the reel-shaft at d d, as above referred to, consists of a pin placed through the collar of the pinion J, and through a hole in the end of the said shaft, which latter is inserted in the collar to receive the pin, and which hole is made large enough to allow the shaft a loose play upon the pin, so as to avoid the strain which would otherwise be upon the pinion and its connections were the shaft connected rigidly thereto. K is a shaft, centered in the plate m, which drives the pinion J of the reel. It has a sleeve, q q, bearing a pinion, n, engaged with the said pinion J. Said sleeve allows the setting back or forward of the reel without disengaging the gearings J n. The shaft K, beyond its journal on the standard h, is connected to the shaft L by universal joint o. The shaft L has a second universal joint, p, which connects it with a pinion, M, which is pivoted in a plate rising from the metal frame Q N, which is centered upon the outer end of the axle Y. The pinion M engages with another pinion, P, on a shaft, O, also centered in this frame. The shaft O lies in a line connecting the axle Y with the axis of spur-wheel R on the platform, and is supported in said frame at the pinion end P, and at the other in a journal near the point where said frame Q N r is hinged to the plate N N on the platform, where said shaft ends in a universal joint, which connects it with the axle of a spur-wheel, R, which is set in a journal on the beam E of the platform. The frame Q N r is supported by a transverse plate, r, hinged in sockets s s in the horizontal bearing-plate N N on the beam E of platform. The cog-wheel R drives the chain of pinions S T U V, S being the sickle-pinion; T, an idle-pinion; U, pinion which drives the lower draper-roller u, and V which drives the upper draper. W is a crown or bevel wheel on the face of supporting-wheel X. Z is the tongue of machine, a horizontal beam attached by journals s s s s to axle Y, and supported in the rear upon the stem 10 of the guiding-wheel 9, which stem has a tiller, 12, at its top to guide the machine. From the front of the tongue Z rises a standard, 4, to which is pivoted a lever, 1, to which an adjustable bar, 3, is attached, whose lower end is attached by a bolt, e, to the point of the V-shaped frame behind the axle Y. The lever is fitted with a spring-catch, 5, whose point enters the holes in standard 2, which rises from the tongue Z.

The operation is as follows: The height of the sickle-bar above the field is adjusted by means of the lever 1', which sustains the weight of the whole frame, platform, and reel in front of axle Y. The slotted wedges a a are used in leveling and setting the sickle-bar in a true line, and to adjust any warp or twist of the frame-work.

The running-gear is simplified by placing it in radial lines from the center of the driving-wheel W, in such a manner as to permit the free operation of the sickle and drapers, notwithstanding any unevenness of the field, and consequent twist and jerk of the machine, and also the raising and lowering adjustment of the sickle, the engaged pinions always maintaining their connections and revolution The frame A A D D may also be set up or lowered by means of the adjustable axle-journals d, adjustable by bolts or screws, or similar devices, upon the curved faces of the posts C C, which curved surfaces are segments of a circle, whose center is socket s s s s of the shaft-frame Q N r at the side of platform E.

The reel may be adjusted more or less forward by means of the movable journal r r on the arm i, and said reel may be also raised or lowered to suit height of grain by its readjustment by bolt with the perforated vertical plate k on the standard h. These alterations of the reel-shaft will not interfere with the gearing together of the pinions n and J, as the former is set upon a sleeve on the shaft K for this purpose.

The elevator H is detachable at pleasure from the platform, complete and entire in its parts, by simply removing the pivotal bolt or pins Z Z Z Z, which hinge it to the platform, and attaching a dropper, for the purpose of making the machine a self-raker, if necessary. The double or parallel drapers run in one direction, carrying grain upward between them, with lapse of the grain back onto the platform, and at any angle up to vertical, for discharge into an attendant wagon or binder.

Having thus fully described my invention, what I claim therein as new, and desire to secure by Letters Patent, is—

1. A suspended gear-frame, having a hinged or pivotal connection with the axle Y and platform E, and constructed to support the gearing mechanism by which the reel, draper-rollers, and cutting-knives are operated, in combination with a gear-wheel attached to the driving-wheel, substantially as and for the purpose set forth.

2. The suspended gear-frame Q N, constructed and attached to the axle and platform as described, and arranged to have the pinion P gear with pinion M, by which the reel is operated by means of the universal joints o p and shafts L K, having their bearings on the reel-post, substantially as and for the purpose set forth.

3. The slotted upright plate $Z^1$, rigidly attached to the cutting-knives, in combination with the friction-roller $Z^2$, arranged on the crank of roller t, having a pinion, S, connected with pinions T U, by which the cutting-knives and draper-rollers are operated simultaneously, substantially as set forth.

4. The elevator-spout H, having the rollers carrying the elevating-aprons journaled therein, pivoted to the platform-frame on an independent journal, so that said spout may be readily detached, substantially as described.

5. The curved posts C C and connecting-bar B, in combination with axle Y and bars D D, carrying the platform E and sickle-bar G, substantially as and for the purpose set forth.

6. The combination of the slotted wedges a a with the connecting bar or brace B of curved posts C C, bars D D, and bolts G G, substantially as and for the purpose set forth.

In testimony that I claim the foregoing harvester I have hereunto set my hand this 22d day of October, 1873.

CHARLES DENTON.

Witnesses:
HENRY W. WELLS,
JAMES M. MORSE.